Patented Jan. 5, 1926.

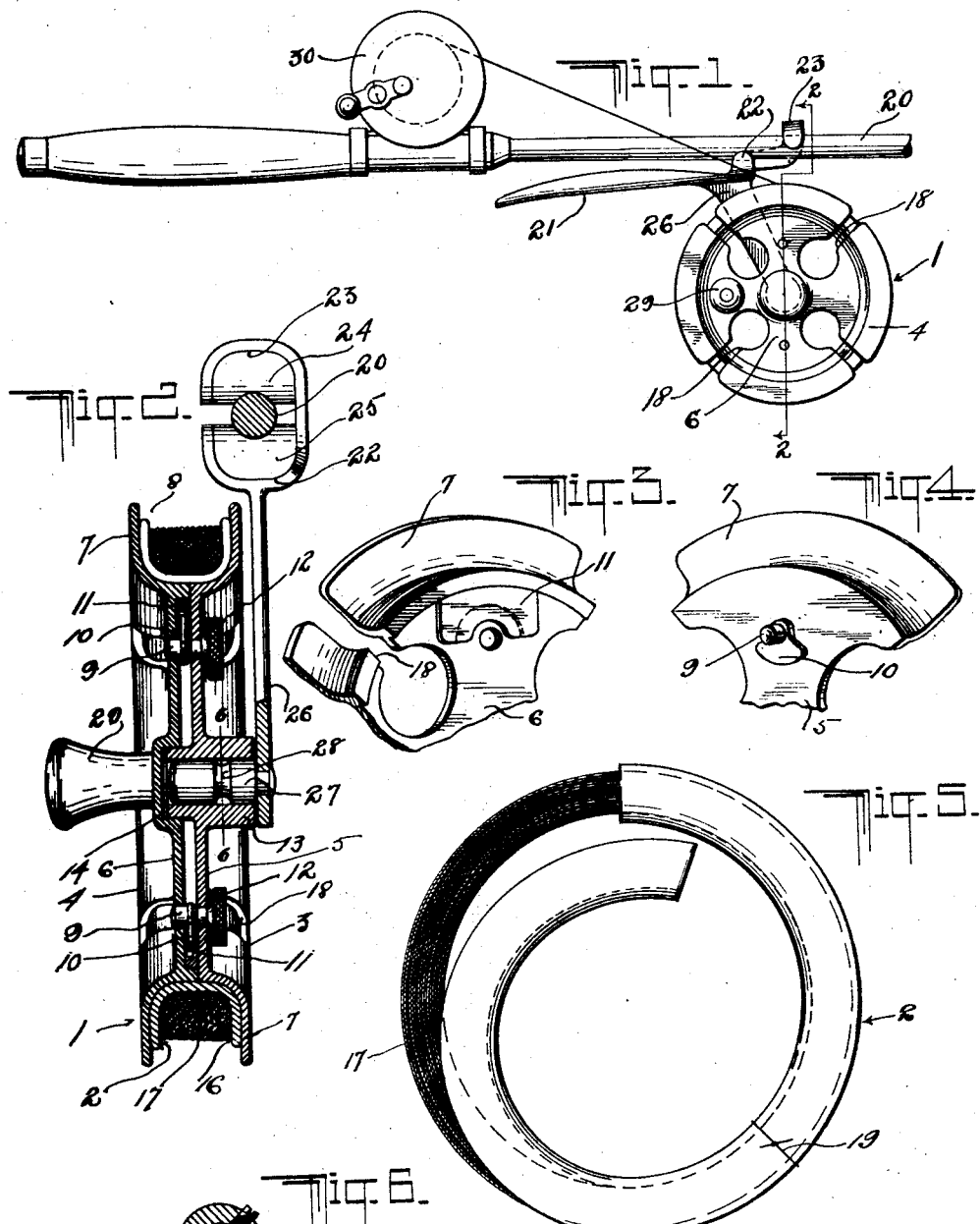

1,568,309

UNITED STATES PATENT OFFICE.

FREDERICK H. AULD, OF COLUMBUS, OHIO, ASSIGNOR TO THE D. L. AULD COMPANY, OF COLUMBUS, OHIO.

SPARE-FISHING-LINE HOLDER AND REEL THEREFOR.

Application filed June 16, 1924. Serial No. 720,296.

*To all whom it may concern:*

Be it known that I, FREDERICK H. AULD, a citizen of the United States, residing at Columbus, in the county of Franklin and State of Ohio, have invented new and useful Improvements in Spare-Fishing-Line Holders and Reels Therefor, of which the following is a specification.

The present invention is directed to improvements in spare fishing line holders and reels therefor.

The primary object of the invention is to provide a device of this character so constructed that spare line holders can be easily and quickly attached to the reel and in a position to permit the line to be unwound from the holder and upon the usual reel spool or unwound from the reel spool and upon the holder when it is desired to change lines.

A further object of the invention is to provide a spare line holder so formed that it can be easily contracted and placed within the confines of a coiled fishing line and when expanded will hold the line firmly on the holder, whereupon the holder can be conveniently placed upon reel holder for transferring the same to the usual reel spool, or may be placed in a tackle box, as desired.

A still further object of the invention is to provide a novel and simple means whereby the reel may be easily and quickly placed upon a fishing rod and held firmly thereon during the winding operation.

With these and other objects in view this invention resides in the novel features of construction, formation, combination and arrangement of parts to be hereinafter more fully described, claimed and illustrated in the accompanying drawings, in which:

Figure 1 is a side elevation of the device showing it engaged with a fishing rod.

Figure 2 is a sectional view on line 2—2 of Figure 1.

Figure 3 is a fragmentary perspective view of one of the sections.

Figure 4 is a similar view of the companion section.

Figure 5 is a side elevation of the spare line holder.

Figure 6 is a sectional view on line 6—6 of Figure 2.

Referring to the drawings the numeral 1 designates generally the improved reel and 2 the spare line holder used in connection therewith. The reel consists of complementary readily separable sections 3 and 4, which comprise central webs 5 and 6, respectively, the peripheries of the webs terminating in flanges 7, curved transversely, and when arranged in confronting relation produce an annular groove 8 for receiving and holding the holder 2.

In order to hold the respective sections 3 and 4 in secured relationship a pair of diametrically opposed thumb actuated pins 9 are rotatably mounted in the web 4 of the section 3, said pins having latch plates 10 fixed upon their inner ends for detachably engaging the keepers 11 carried by the web 6 of section 4. The pins 9 are provided with heads 12 and it will be obvious that they may be grasped and the pins rotated to cause the latch plates to engage or disengage the keepers 11.

The web 5 is provided with a hub 13, while the web 6 has a socket 14 which is alined with said hub. This hub has carried thereby a spring pressed ball 15, the purpose of which will appear later.

The spare line holder 2 is in the nature of a split ring which is preferably formed from leather treated with any suitable composition that will withstand ravages of dampness. This holder, being split, is readily contractible and is curved in cross section to provide a groove 16 for receiving the fishing line 17. The fact that the holder may be contracted permits the same to be readily placed in or removed from the confines of a coiled line and in this manner a line can be conveniently transferred from its original holder to the present holder.

In instances where a wet line is wound from the usual reel spool upon the holder 2, said holder may be contracted or collapsed to permit the line, in a coiled condition to be removed therefrom in order to permit the same to dry, it being obvious that as soon as the line is removed from the holder the coils thereof will separate from the confined position assumed when engaged with the holder to permit the same to more quickly dry. After the line is thoroughly dry the holder may be readily applied thereto in an obvious manner.

The sections 3 and 4 are provided with radial slots 18, the presence of which permit short lengths of strings 19 to be tied around the holder 2 and line 17 in order to hold the line upon the holder and to prevent the separation of the coils.

When changing lines it is necessary that the reel 1 be supported upon the fishing rod 20 and to accomplish this a handle 21 is provided, the forward end of which carries diagonally disposed seats 22 and 23 in which are secured rubber blocks 24 and 25, respectively, which engage the rod 20. Depending from the handle 21 is an arm 26, the lower end of which is provided with a laterally extending stub shaft 27 for rotatably engaging the hub 13, the free end of said shaft being engaged in the socket 14. This shaft is provided with an annular groove 28 in which the ball 15 snaps to hold the reel 1 against endwise movement on the shaft, but at the same time permitting the same to rotate freely during the winding or unwinding operation. The reel may be readily removed from the shaft upon pulling laterally thereon with sufficient force to cause the ball 15 to disengage the groove 28.

Since the seats 22 and 23 are diagonally disposed the rod 20 may be engaged therewith upon passing the same between the gap dividing the seats and upon pressing upwardly upon the handle 21 said handle will be firmly engaged with the rod, but may be quickly disengaged therefrom.

The section 4 has carried thereby a handle 29 through the medium of which the reel can be conveniently rotated.

When it is desired to wind a line upon the spool of the usual reel 30 the sections 3 and 4 are separated and the holder 2 is clamped in the groove 8 when the sections are secured together. One end of the line is then suitably secured to the reel spool and upon rotating said spool the line will be conveniently wound thereon from the holder 2, it being of course obvious that to wind a line from the reel spool to the holder it is necessary to manually rotate the reel 1 through the medium of the handle 29.

What is claimed is:—

1. The combination with a fishing rod, of a reel, means for rotatably and detachably connecting the reel with the rod, a spare line holder consisting of a collapsible split ring, and means for detachably connecting the holder with the reel.

2. The combination with a fishing rod, of a handle, means for detachably connecting the handle to the rod, an arm carried by the handle, a reel rotatably associated with the arm, and a spare line holder consisting of a collapsible split ring capable of being detachably carried by the reel.

3. A combined reel and spare fishing line holder comprising a pair of complementary sections having transversely curved peripheral flanges constituting a groove when the sections are in clamped confronting relation, said groove serving to receive the spare line holder, means for detachably connecting the sections, and means for detachably connecting the reel to a fishing rod.

4. The combination with a fishing rod, of a reel comprising a pair of separable sections, one of said sections having keepers carried thereby, latch plates carried by the other section for detachably engaging the keepers, said sections having their peripheries formed to produce a groove when mutually engaged, a hub carried by one of the sections, a handle detachably engaged with the rod, a shaft associated with the handle, said hub being rotatably and detachably engaged with the shaft.

5. In combination with a fishing rod, a handle having seats thereon for detachably engaging the rod, an arm carried by the handle and having a shaft thereon, a reel comprising a pair of detachably connected sections having their peripheries formed with transversely curved flanges adapted to form a groove when the sections are in intimate contact with each other, a hub carried by one of the sections for rotatably engaging the shaft, and a split collapsible grooved ring constituting a spare line holder for engaging the groove.

6. As a new article of manufacture, a spare fishing line holder comprising an expansible and contractible circumferentially grooved ring.

7. As a new article of manufacture, a spare fishing line holder comprising an annularly grooved ring, in the groove of which a line is adapted to be coiled, said ring being split and capable of being expanded or contracted within the confines of the coils of the line.

8. In combination with a fishing rod, a handle having diagonally opposed seats carried thereby capable of gripping the rod when the handle is substantially parallel therewith, an arm disposed in angular relation with respect to the handle, and a reel detachably engaged with the arm.

In testimony whereof I have hereunto set my hand.

FREDERICK H. AULD.